US009253479B2

(12) United States Patent
Yun et al.

(10) Patent No.: US 9,253,479 B2
(45) Date of Patent: Feb. 2, 2016

(54) METHOD AND APPARATUS FOR DISPLAYING PARTIAL 3D IMAGE IN 2D IMAGE DISPLAY AREA

(75) Inventors: Hae-Young Yun, Suwon-si (KR); Ung-Gyu Min, Namyangju-si (KR); Myung-Hwan Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1085 days.

(21) Appl. No.: 13/209,139

(22) Filed: Aug. 12, 2011

(65) Prior Publication Data

US 2012/0194509 A1 Aug. 2, 2012

(30) Foreign Application Priority Data

Jan. 31, 2011 (KR) .......................... 10-2011-0009829

(51) Int. Cl.
*H04N 13/02* (2006.01)
*H04N 13/04* (2006.01)
*H04N 13/00* (2006.01)

(52) U.S. Cl.
CPC ....... *H04N 13/0456* (2013.01); *H04N 13/0022* (2013.01); *H04N 13/0066* (2013.01); *H04N 2013/0081* (2013.01)

(58) Field of Classification Search
CPC .......... H04N 13/0022; H04N 13/0456; H04N 2013/0081
USPC ............................ 348/43, 51, 54, 59; 345/419
See application file for complete search history.

(56) References Cited

U.S. PATENT DOCUMENTS

| 4,907,174 | A | * | 3/1990 | Priem | ...................... | G09G 5/14 345/419 |
| 6,118,584 | A | | 9/2000 | Van Berkel et al. | | |
| 6,157,424 | A | * | 12/2000 | Eichenlaub | ........ | G02B 27/2214 348/E13.022 |
| 7,626,643 | B2 | * | 12/2009 | Ijzerman et al. | ................. | 349/15 |
| 7,986,374 | B2 | * | 7/2011 | Ijzerman et al. | ................. | 349/15 |
| 8,035,762 | B2 | * | 10/2011 | Ijzerman et al. | ................. | 349/15 |
| 8,154,799 | B2 | * | 4/2012 | Kim et al. | ..................... | 359/463 |
| 8,279,272 | B2 | * | 10/2012 | Lipton | .................... | H04N 5/72 348/59 |
| 2003/0202735 | A1 | | 10/2003 | Dunec et al. | | |
| 2004/0240777 | A1 | * | 12/2004 | Woodgate et al. | .............. | 385/16 |
| 2006/0181895 | A1 | * | 8/2006 | Hu et al. | ...................... | 362/551 |

(Continued)

FOREIGN PATENT DOCUMENTS

CN 1971340 5/2007
EP 1463341 9/2004

(Continued)

OTHER PUBLICATIONS

Ayako Takagi, et al. "30.3: Autostereoscopic Partial 2-D/3-D Switchable Display Using Liquid-Crystal Gradient Index Lens" published in SID 10 Digest, p. 436-439.

(Continued)

*Primary Examiner* — David Harvey
(74) *Attorney, Agent, or Firm* — H.C. Park & Associates, PLC

(57) ABSTRACT

To display at least one three-dimensional (3D) image in a two-dimensional (2D) image display area, a method and apparatus is provided for distinguishing a 3D image display area, in which the at least one 3D image is displayed, from the 2D image display area, and displaying a 2D image and a 3D image in the 2D image display area and the 3D image display area, respectively, thereby improving display resolution.

16 Claims, 9 Drawing Sheets

(56) References Cited

U.S. PATENT DOCUMENTS

| | | | |
|---|---|---|---|
| 2007/0222855 A1* | 9/2007 | Krijn et al. ................... | 348/42 |
| 2008/0259063 A1 | 10/2008 | Kim et al. | |
| 2009/0315980 A1* | 12/2009 | Jung et al. ................... | 348/43 |
| 2010/0073768 A1* | 3/2010 | Kim et al. .................... | 359/463 |
| 2010/0158351 A1* | 6/2010 | De Jong et al. .............. | 382/154 |
| 2011/0157169 A1* | 6/2011 | Bennett .................. | G06F 3/14 345/419 |
| 2011/0255796 A1* | 10/2011 | Nakamura et al. ........... | 382/232 |
| 2011/0293240 A1* | 12/2011 | Newton et al. ............... | 386/230 |
| 2012/0050341 A1* | 3/2012 | Wu .................. | H04N 13/0456 345/690 |
| 2012/0050482 A1* | 3/2012 | Boross .............. | H04N 13/0018 348/46 |
| 2012/0069151 A1* | 3/2012 | Tsai et al. .................... | 348/47 |
| 2012/0194509 A1* | 8/2012 | Yun et al. .................... | 345/419 |
| 2012/0212579 A1* | 8/2012 | Frojdh et al. ................. | 348/43 |
| 2012/0223941 A1* | 9/2012 | Sekine .............. | H04N 13/0422 345/419 |

FOREIGN PATENT DOCUMENTS

| | | | |
|---|---|---|---|
| JP | 403045994 A | * | 2/1991 |
| JP | 2004-001209 | | 1/2004 |
| JP | 2006-186768 | | 7/2006 |
| JP | 2008-271490 | | 11/2008 |
| JP | 2010-164852 | | 7/2010 |
| KR | 20030089272 A | * | 11/2003 |
| WO | 2004/030377 | | 4/2004 |

OTHER PUBLICATIONS

Ming-Der Chou, et al. "P-77: A Novel 2-D/3-D Arbitrarily Switchable Autostereoscopic Display" published in SID 09 Digest, p. 1407-1410.

Unpublished U.S. Appl. No. 12/903,586, filed Oct. 13, 2010.

Notification of Reason for Rejection dated Sep. 15, 2015, in Japanese Patent Application No. 2011-225279.

* cited by examiner

METHOD AND APPARATUS FOR DISPLAYING PARTIAL 3D IMAGE IN 2D IMAGE DISPLAY AREA

CROSS-REFERENCE TO RELATED APPLICATION

This application claims priority from and the benefit of Korean Patent Application No. 10-2011-0009829, filed on Jan. 31, 2011, the disclosure of which is incorporated by reference herein in its entirety.

BACKGROUND

1. Technical Field

The present invention relates to a method and apparatus for displaying at least one three-dimensional (3D) image display area in a two-dimensional (2D) image display area, as well as a method and apparatus for displaying at least one 3D image in a 2D image display area.

2. Discussion of the Related Art

A 3D effect of an object, also called binocular disparity, may be achieved when a viewer or an observer simultaneously views the object through retinas of his or her left and right eyes in different directions and recognizes it by means of the brain. Therefore, to display a 3D image, left and right eyes of a viewer are allowed to view different images using the principle of the binocular disparity, enabling the viewer to recognize the 3D image.

3D display technology may be classified into stereoscopic display technology, which requires a viewer to wear special glasses such as shutter glasses to view a 3D stereoscopic image, and autostereoscopic display technology, which does not require the viewer to wear glasses. A stereoscopic display may use liquid crystal shutter glasses, in which right-eye liquid crystals and left-eye liquid crystals alternately pass and block the light at determined periods, and a driving device for these shutter glasses. Therefore, different left-eye images and right-eye images are separated and provided, allowing the viewer to recognize a relevant stereoscopic image.

Autostereoscopic display technology may include a parallax barrier 3D display device and a lenticular 3D display device. The parallax barrier 3D display device includes a parallax barrier mounted in front of a display panel with pixels arranged in a matrix of rows and columns, and having apertures in the form of a vertical grid. The parallax barrier separates a right-eye image from a left-eye image for the right and left eyes of a viewer, causing binocular disparity between the different right-eye and left-eye images in the display panel. The lenticular 3D display device or a lenticular device includes a lenticular lens sheet having an array of semicylindrical lenses in the column direction instead of the parallax barrier in the form of a vertical grid; a flat-surfaced plate facing the lenticular lens sheet; liquid crystal filled between the lenticular lens sheet and the flat-surfaced plate; and electrodes formed on inner sides of the lenticular lens sheet and the flat-surfaced plate. This lenticular device is mounted in front of the display panel, and the display device may switch between 2D and 3D display modes by turning on/off a voltage applied to the electrodes. In the 2D mode, in the viewing direction, the refractive index of the liquid crystal becomes substantially identical to the refractive index of a material used for the lenticular lens sheet depending on the presence/absence of a voltage applied across the liquid crystal material, thereby removing the lens effect of the lenticular device. In this case, the lenticular device may serve as a light transmission plate on the display panel without affecting the path of light coming out from the display panel. On the other hand, in the 3D mode, as the refractive index of the liquid crystal becomes different from the refractive index of the material used for the lenticular lens sheet according to the alignment of the liquid crystal material due to the presence/absence of a voltage applied across the liquid crystal material, the lenticular device may serve as a lens, thereby providing different images to left and right eyes of a viewer and allowing the viewer to perceive a stereoscopic image.

It is important for an autostereoscopic 3D display apparatus to have a number of available view points, because the view point, at which a viewer can watch a 3D image, may be fixed. In order to enable viewers to watch a 3D image at multiple view points, the display apparatus should receive appropriate input data. The appropriate input data may include a sequence of input images for the central view point and a sequence of depth maps corresponding thereto. Pixels may be shifted to depth maps corresponding to input images, generating a set of output images, which correspond to the number of view points. Using the set of output images, an autostereoscopic 3D image signal or a synthesized stereoscopic image signal may be generated to drive a Liquid Crystal Display (LCD) panel using a lenticular device. A look-up table of pixel-shift data based on a plurality of view points and their depth data is stored in a memory, and a display apparatus displays 3D image data by image data shifted based on the pixel-shift data.

If the number of view points increases for 3D image display, a resolution is inversely proportional to the number of view points. When a 3D image is displayed in a 2D image display area, and 2D image displaying is carried out in the 2D image display area in 3D image displaying by the above-described technologies, a resolution of the display for all images including 2D images decreases if the number of view points increases. This decreased resolution negatively impacts display quality.

SUMMARY OF THE INVENTION

Exemplary embodiments of the present invention provide a method capable of displaying at least one partial 3D image in a 2D image display area to improve display resolution.

Exemplary embodiments of the present invention also provide an apparatus capable of displaying at least one partial 3D image in a 2D image display area to improve display resolution.

Exemplary embodiments of the present invention also provide a method for distinguishing a 3D image display area in a 2D image display area to improve display resolution.

Exemplary embodiments of the present invention also provide a circuit for distinguishing a 3D image display area in a 2D image display area to improve display resolution.

Additional features of the invention will be set forth in the description which follows, and in part will be apparent from the description, or may be learned by practice of the invention.

An exemplary embodiment of the present invention discloses a method for autostereoscopically displaying a three-dimensional (3D) image existing in at least one partial 3D image area located in a two-dimensional (2D) image display area, on a display panel at a first view point based on input data comprising 2D input image data and its associated input depth data. The method includes distinguishing each 3D shift image area from the 2D image display area in a boundary of the at least one partial 3D image area at each given view point among a plurality of given view points being different from the first view point, based on data values of the input depth data.

An exemplary embodiment of the present invention also discloses an apparatus for autostereoscopically displaying a three-dimensional (3D) image existing in at least one partial 3D image area located in a two-dimensional (2D) image display area, on a display panel at a first view point based on input data comprising 2D input image data and its associated input depth data. The apparatus includes a 3D area distinguishing circuit configured to distinguish each 3D shift image area from the 2D image display area in a boundary of the at least one partial 3D image area at each given view point among a plurality of given view points being different from the first view point, based on data values of the input depth data being different from a reference value.

An exemplary embodiment of the present invention also discloses a method for distinguishing a three-dimensional (3D) image in at least one partial 3D image area located in a two-dimensional (2D) image display area at a first view point, based on input data comprising 2D input image data and its associated input depth data. The method includes distinguishing a 3D shift image area from the 2D image display area by comparing the input depth data associated with the 2D input image data with reference data in a boundary of the at least one partial 3D image area at a given view point being different from the first view point.

An exemplary embodiment of the present invention also discloses an apparatus for distinguishing a three-dimensional (3D) image in at least one partial 3D image area located in a two-dimensional (2D) image display area at a first view point, based on input data comprising 2D input image data and its associated input depth data. The apparatus includes a 3D image distinguishing circuit configured to distinguish a 3D shift image area from the 2D image display area by comparing the input depth data associated with the 2D input image data with reference data in a boundary of the at least one partial 3D image area at a given view point being different from the first view point.

An exemplary embodiment of the present invention also discloses a method of displaying a three-dimensional (3D) image. The method includes displaying a first image during a first period of an image frame, and displaying a second image during a second period of the image frame. The first image is interwoven at a first resolution, and the second image is interwoven at a second resolution different from the first resolution.

An exemplary embodiment of the present invention also discloses a method of displaying a three-dimensional (3D) image. The method includes displaying a first image during a first period of an image frame, displaying a second image during a second period of the image frame, and displaying a third image during a third period of the image frame. The first image and the second image are two-dimensional images, and the third image is a 3D image.

An exemplary embodiment of the present invention also discloses a method of displaying an image on a display device using at least three operation modes. The method includes displaying, in a first operation mode, a first two-dimensional (2D) image during a first frame using a 2D image rendering process. In a second operation mode, a first three-dimensional (3D) image is displayed during a second frame using a 3D image rendering process, and in a third operation mode, a 2D image is displayed during a first period of a third frame and a 3D image is displayed during a second period of the third frame.

An exemplary embodiment of the present invention also discloses a method of displaying a three-dimensional (3D) image on a display panel comprising pixels. The method includes displaying a two-dimensional (2D) image during a first period of an image frame by using first pixels to display the 2D image according to 2D image input data and by setting second pixels at the same gray value, and displaying a 3D image during a second period of the image frame by using the second pixels to display the 3D image according to 3D image input data and by setting the first pixels at the same gray value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
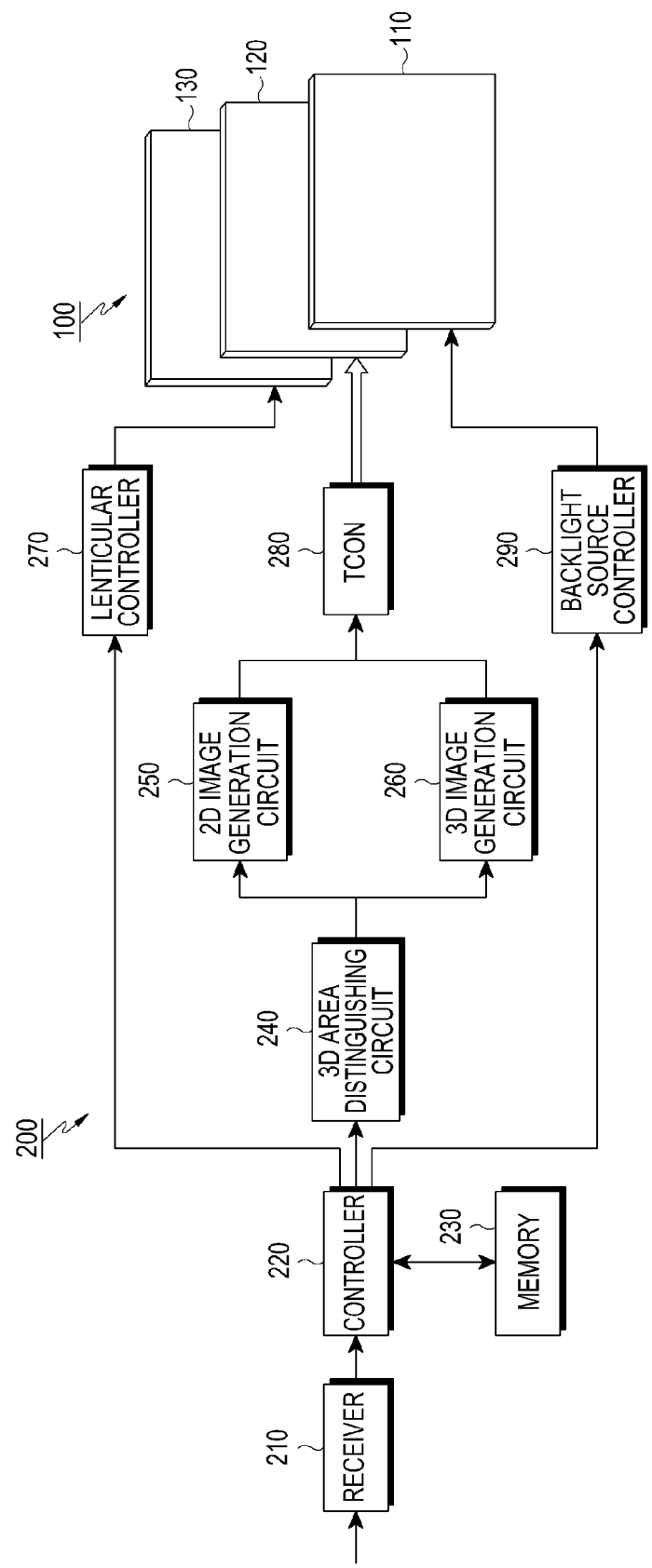
FIG. 1 is a schematic block diagram illustrating a drive unit and a display unit according to an exemplary embodiment of the present invention.

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the exemplary embodiments described herein can be made without departing from the scope and spirit of the invention. In addition, descriptions of well-known functions and constructions may be omitted for clarity and conciseness.

Throughout the drawings, the same drawing reference numerals will be understood to refer to the same elements, features and structures.

A method and apparatus capable of autostereoscopically displaying a 3D image existing in at least one partial 3D image area in a 2D image display area according to an exemplary embodiment of the present invention will be described in detail below. While various numerical values will be presented in exemplary embodiments of the present invention, it should be noted that such numerical values are provided as examples. Thus, they are not intended to limit the scope of the present invention, unless defined in the appended claims.

FIG. 1 schematically illustrates an apparatus capable of autostereoscopically displaying a 2D image, and a 3D image in the 2D image on a single screen. The apparatus includes a display unit 100 and a drive unit 200. The display unit 100 includes a display panel 120, such as a liquid crystal display (LCD) panel, a backlight source 110 situated behind the display panel 120, and a lenticular device 130 situated in front of the display panel 120. The display panel 120 includes pixels (not shown) arranged in a matrix of rows and columns, and the pixels include thin film transistors (TFTs) whose gates, sources, and drains are connected to row lines (or gate lines), column lines (or data lines), and pixel electrodes, respectively. The display panel 120 includes a first substrate on which row and column lines, TFTs, and pixel electrodes are formed, a second substrate with a common electrode facing the pixel electrodes, liquid crystal filled between the first and second substrates, and a polarizer or polarizers situated on an outer side(s) of any one or both of the first and second substrates. The display panel 120 may include a gate drive device for driving the gate lines, and a data drive device for driving the data lines. The backlight source 110 generates irradiation light at the back of the display panel 120, and changes in alignments of liquid crystal, occurring due to a voltage applied between the pixel electrodes and the common electrode, i.e., changes in refractive indexes of the liquid crystal, modulate transmission of the irradiated light, thereby generating an image. Although named "backlight" source 110, the light source 110 may be any type of light source capable of providing light to the display panel 120. The lenticular device 130 is capable of switching between 2D and 3D display modes on the display panel 120, as described above. Although the display unit 100 is described here as an LCD display and lenticular device, exemplary embodiments of the present invention may be applied to any type of display device that is capable of displaying a 3D image. Furthermore, exemplary embodiments of the present invention may be utilized in both known and yet-to-be manufactured 3D display devices.

The drive unit 200 represents a rendering device that renders at least one partial 3D image in a 2D image display area according to exemplary embodiments of the present invention.

The drive unit 200 includes a receiver 210, a controller 220, a memory 230, a 3D area distinguishing circuit 240, a 2D image generation circuit 250, a 3D image generation circuit 260, a lenticular controller 270, a Timing Controller (TCON) 280, and a backlight source controller 290. The receiver 210 decodes an input signal, and the controller 220 performs a program stored in the memory 230. Under control of the controller 220, the 3D area distinguishing circuit 240 generates a 3D shift image area from 2D input image data and its associated input depth data, which represent partial 3D images in a 2D image area, seen at a front view point, for each of a plurality of given view points. The 2D image generation circuit 250 generates pixel data of 2D images existing in each 2D image area outside of each 3D shift image area, for each view point, and allocates a gray value to pixels in each 3D shift image area. The allocated gray value may be a black gray value, a white gray value, or some other arbitrarily chosen gray value. The 3D image generation circuit 260 generates pixel data of a 3D image in each 3D shift image area based on the input depth data for data in the 3D shift image area, and allocates a gray value to pixels in each 2D image area outside of each 3D shift image area. The allocated gray value may be a black gray value, a white gray value, or some other arbitrarily chosen gray value. The TCON 280 provides timing information to enable the display panel 120 to display images, based on the image data generated from the 2D image generation circuit 250 and the 3D image generation circuit 260 for each view point in two periods, respectively, which together are shorter than a oneframe period of the 2D input image data and its associated input depth data. The backlight source controller 290 controls the backlight source 110 to radiate irradiation light in these two periods. The lenticular controller 270 supplies power to the lenticular device 130 so as to generate 3D images in the second of the two periods. Here, the 3D area distinguishing circuit 240, the 2D image generation circuit 250, and the 3D image generation circuit 260 may be implemented using, for example, a Field-programmable Gate Array (FPGA) or an application-specific integrated circuit (ASIC).

An input image signal stream decoded by the receiver 210 may be stored in the memory 230 under control of the controller 220. The receiver 210 may include, for example, a digital modem, and the controller 220 may be, for example, a microprocessor or a central processing unit.

Figure 2:
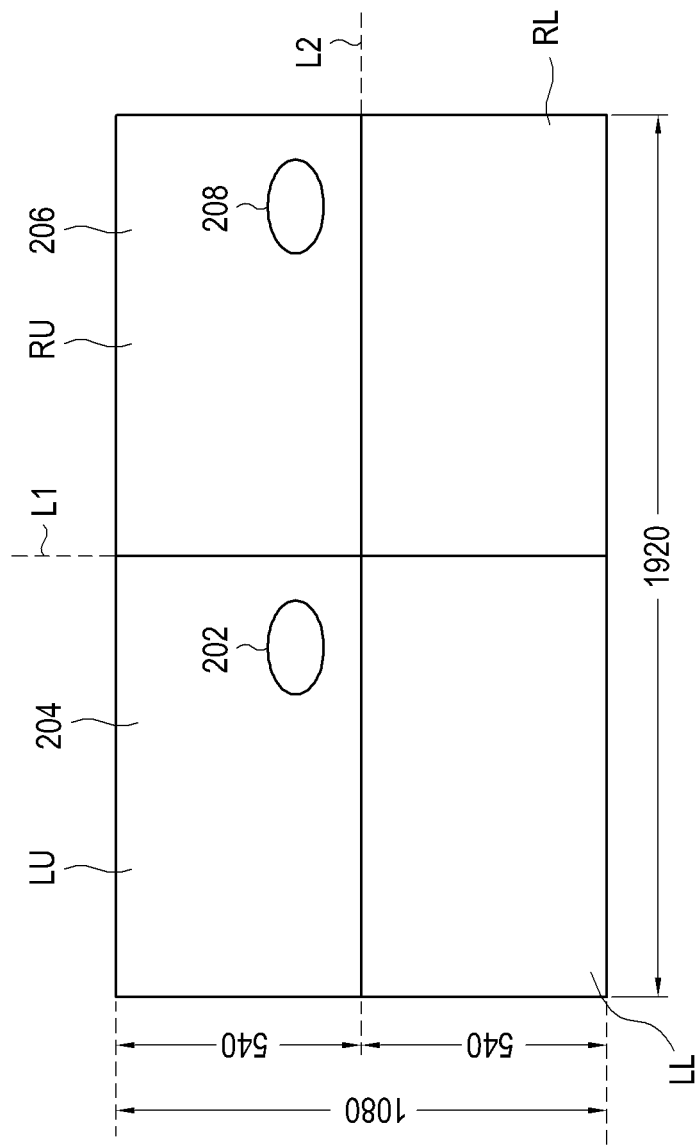
FIG. 2 is a diagram illustrating an input image used according to an exemplary embodiment of the present invention.

The image signal data decoded by the receiver 210 may be the data illustrated in FIG. 2.

FIG. 2 schematically illustrates image data having a high resolution of a Full High Definition (FHD) or 1920×1080 pixels. Lines L1 and L2 divide the 1080 rows and 1920 columns into four equal parts. Each of a left upper area LU, a right upper area RU, a left lower area LL, and a right lower area RL has a resolution of 960×540. The left areas LU and LL represent color information, while the right areas RU and RL represent depth information. The color information is information used to display a color image. For example, the colors Red (R), Green (G) and Blue (B) may be used to display an image. The upper areas LU and RU represent color and depth information, respectively, for images seen at the front, while the lower areas LL and RL represent color and depth information, respectively, for images seen at the rear. In other words, the upper areas LU and RU represent foreground information, and the lower areas LL and RL represent background information. Further, pixels in the area LU represent 2D input image data seen at the central view point, for example, a fifth view point out of nine view points in front of the screen, while pixels in the area RU represent depth data corresponding to the 2D input image data in the area LU. Likewise, the area LL represents rear image data of the 2D input image in the area LU, i.e., input background image data, while the area RL represents depth data of the input background image data in the area LL. Although described here that the decoded image signal includes information for the areas LU, RU, LL, RL, other alternatives are possible. For example, the decoded information may only include information for the areas LU and RU, and the information for the areas LL and RL can be calculated using the information for the areas LU and RU.

As illustrated in FIG. 2, the area LU has a partial 3D input area 202 existing in a 2D input image area 204, and the area RU has a partial 3D input depth data area 208 corresponding to the partial 3D input area 202. Pixels in the area LU have a one-to-one relationship with pixels in the area RU, and pixels in the area LL have a one-to-one relationship with pixels in the area RL. That is, a pixel in an i-th row and a j-th column in the area LU corresponds to a pixel in the i-th row and the j-th column in each of the areas RU, LL and RL. Therefore, from the pixels in the same rows and columns can be acquired color information, depth information, background color information, and background depth information.

To autostereoscopically display a partial 3D input image existing in the partial 3D input area 202 located in the 2D input image area 204, changes in depth values of pixels on a boundary of the partial 3D input image at each of a plurality of view points should be detected, and a 2D area having not been moved should be distinguished from a 3D area having been moved by pixels shifted by the detection.

Depth values may be represented using gray values. Pixel-shift data, which may be determined at each view point using the gray values or the depth values, is disclosed in United States Patent Publication No. 2010/0007661, mentioned above and incorporated by reference. For a better understanding of exemplary embodiments of the present invention, FIG. 5 from United States Patent Publication No. 2010/0007661 is discussed here.

Figure 5:
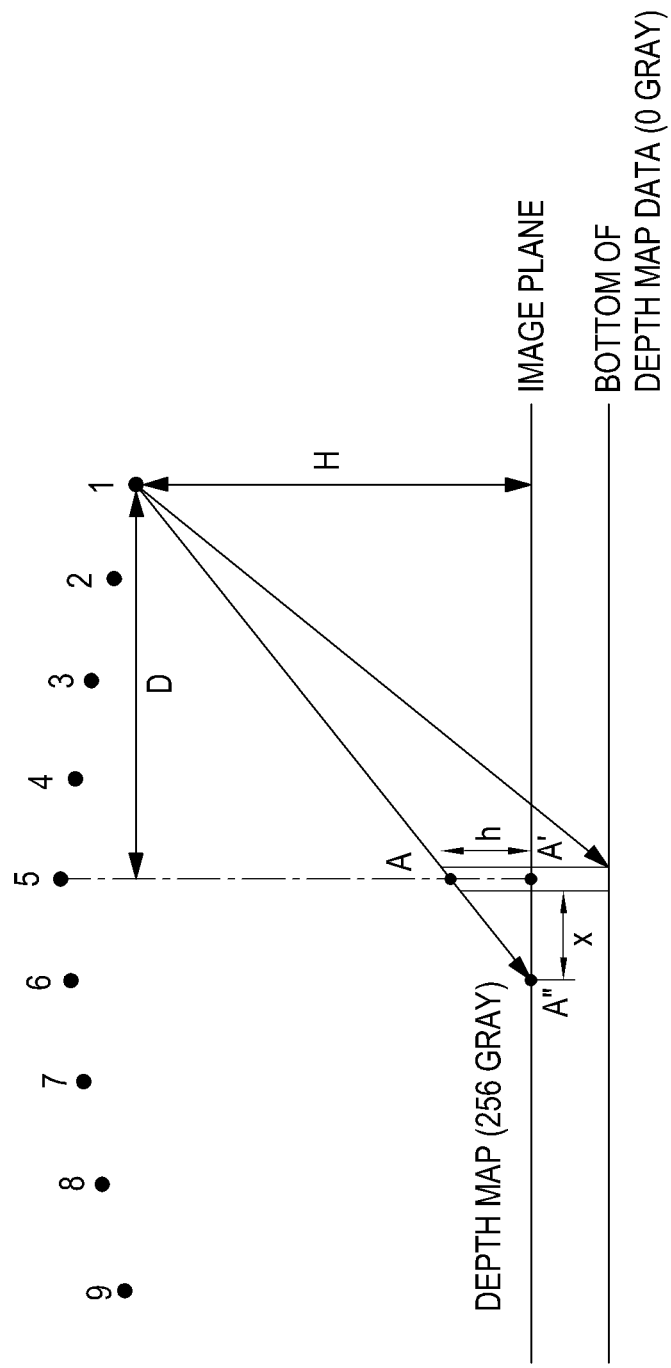
FIG. 5 is a conceptual diagram illustrating an example of shifting image data depending on depth data.

Referring to FIG. 5, nine view points are situated in front of the screen. With a color display, each pixel may include R, G, and B sub-pixels. Assume that each pixel, i.e., each sub-pixel, has 8-bit data. Then, each pixel may have $2^8$=256 gray values. Assuming that a gray value of the screen, i.e., a reference value, is 128, gray values of pixels to be shown in front of the screen will have values of 129 to 256, while gray values of pixels to be shown behind the screen will have values of 1 to 127. If a point A being perpendicular to the surface of the screen and having a height h in a direction of the central view point 5 is the highest point, i.e., if the point A is the maximum-height point, then a gray value of the point A is 256. In this manner, if the maximum-height value is given, gray values or depth values for the heights below the maximum height may be determined. Here, the lowest height has a gray value of 1. If the highest height and the lowest height are given, gray values of heights may be determined. If a height h of the point A is given, its gray value may be determined. Pixel-shift data may be calculated for each view point for the point A. When the point A is seen at the first view point 1, pixel-shift data (x) from the point A to the point A" on the screen may be expressed by Equation (1) on a pixel basis.

$$\text{pixel-shift data } (x) = (h*D)/\{q*(H-h)\} \quad (1)$$

where H represents a perpendicular distance from the first view point 1 to the screen, h represents a height of the point A, and D represents a shortest distance from the central view point line to the first view point 1, and q represents the width of a sub-pixel. If the height value h is given, its gray value or depth value may be determined, and pixel-shift data at each view point may be calculated using Equation (1). Therefore, if a gray value or a depth value is given, pixel-shift data for the depth value for each of nine view points may be calculated, and a look-up table including 256 gray values and the pixel-shift data for the nine view points may be made and stored in the memory 230. Pixel-shift data for each view point may be calculated using Equation (1), or may be determined by referring to the look-up table.

While a reference gray value of the screen will be assumed to be 128 in the following description of exemplary embodiments of the present invention, an alternative reference value may be selected as a gray value or a reference depth value of the screen according to the proposed design.

Figure 3:
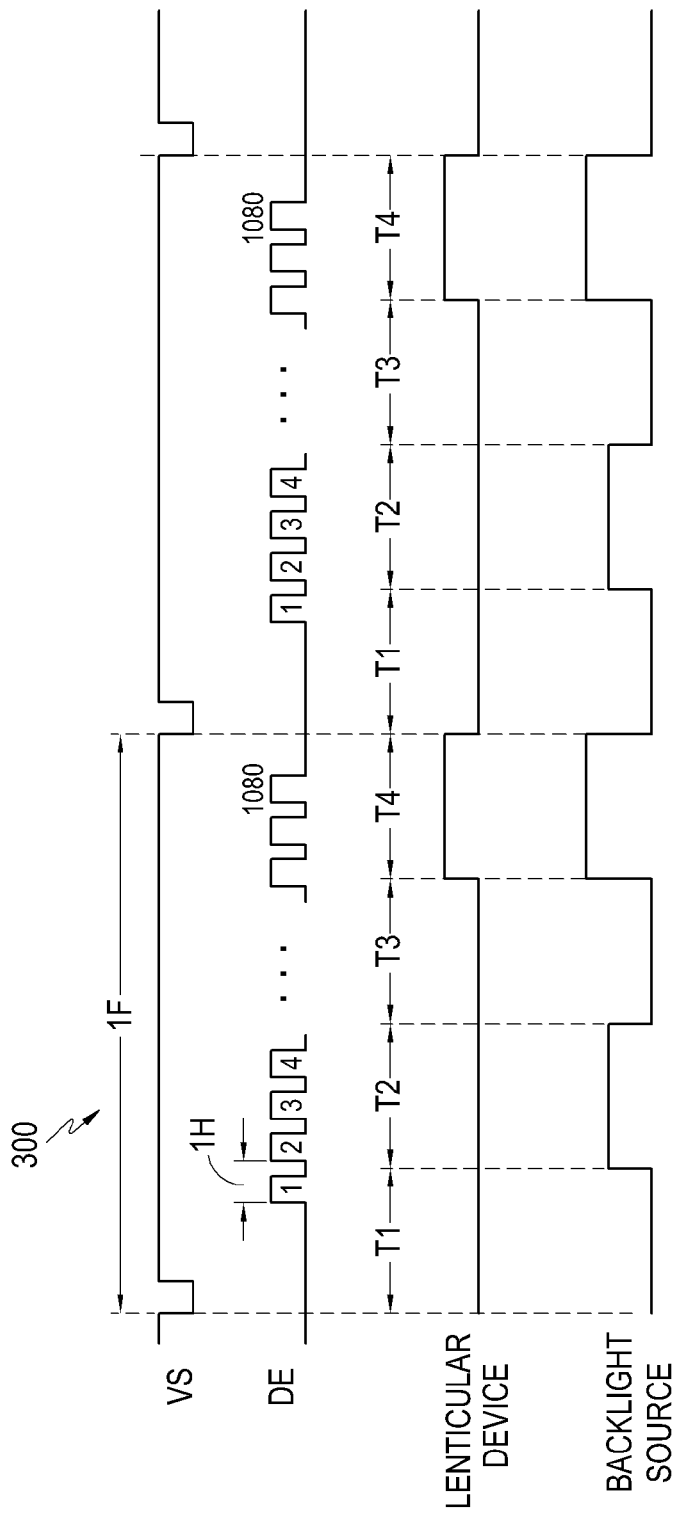
FIG. 3 is a schematic timing diagram illustrating an operation according to an exemplary embodiment of the present invention.

FIG. 3 illustrates an operation timing diagram according to an exemplary embodiment of the present invention for displaying an image using image data such as that illustrated in FIG. 2. Because the input image illustrated in FIG. 2 has an FHD resolution or a resolution of 1920×1080, it may be provided as a data enable signal DE having 1920-pixel data in each horizontal cycle 1H among 1080 horizontal cycles. Along with the data enable signal DE, a vertical synchronization signal VS may be made based on vertical synchronization signal information, and a data enable signal DE having 1080 horizontal cycles within one frame 1F may be generated from an input enable signal. Input image data within one frame, i.e., the input image data illustrated in FIG. 2 and existing within one frame, is stored in the memory 230. Therefore, input image data, which was stored in the memory 230 in a frame preceding the current frame 300 illustrated in FIG. 3, generates its output image in the current frame 300. In a period T1, an output image is output, which is obtained by allocating a black gray value to input image data in the previous frame. The output image is provided to the LCD panel 120 so that pixel data values of all pixels having the input image data provided in the previous frame may have a black gray value. In other words, a black image may be generated in the period T1. The backlight source 110 and the lenticular device 130 are both off in the period T1.

Figure 6A:
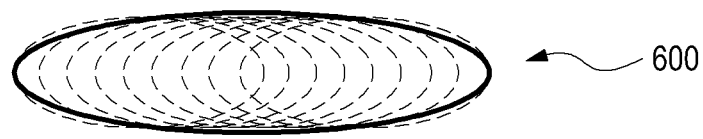
FIG. 6A shows a 3D sum area according to an embodiment of the present invention.
Figure 6B:
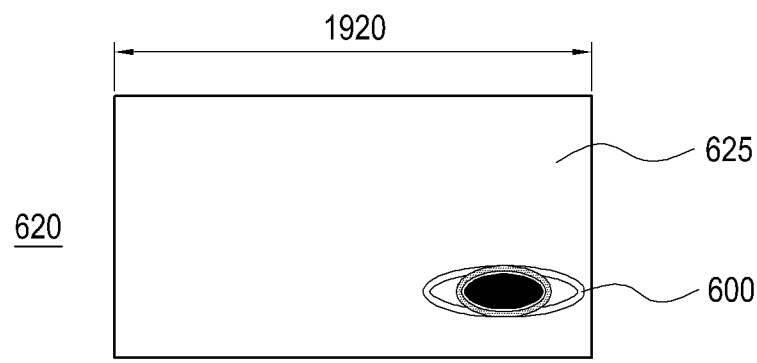
FIG. 6B and FIG. 6C show examples of an output image provided to a display panel according to an embodiment of the present invention.

In a period T2, pixel values of pixels in a 3D sum area corresponding to a sum of distinguished partial 3D shift areas for all view points are allocated a gray value. The allocated gray value may be a black gray value, a white gray value, or some other arbitrarily chosen gray value. The remaining 2D image is generated in the 2D area outside of the 3D sum area based on input image data in the area LU of FIG. 2. Alternatively, input image data in the area LL may be used. A 2D sum image signal with a 3D sum area having an allocated gray value and the remaining 2D image is generated, and the 2D sum image signal is provided to the LCD panel 120 in the period T2. The backlight source 110 is on in the period T2, whereas the lenticular device 130 is off. FIG. 6A shows a 3D sum area according to an embodiment of the present invention, and FIG. 6B shows an example of an output image provided to a display panel according to an embodiment of the present invention. In the example shown in FIG. 6A, in the case of 9 views, 3D sum area 600 includes the area of 9 distinguished partial 3D shift areas. The 9 distinguished partial 3D shift areas are shown using dotted ovals. FIG. 6B shows an example of an output image 620 including 3D sum area 600, which has an allocated gray value, and the remaining 2D image area 625, where the 2D image is displayed, when displaying a 2D image in period T2 using the input image data of FIG. 2.

In a period T3, like in the period T1, the output image is provided to the LCD panel 120 so that pixel data values of all pixels having the input image data provided in the previous frame may have a black gray value. Thus, like in period T1, a black image may be generated in the period T3. The lenticular device 130 and the backlight source 110 are both off in the period T3.

Figure 6C:
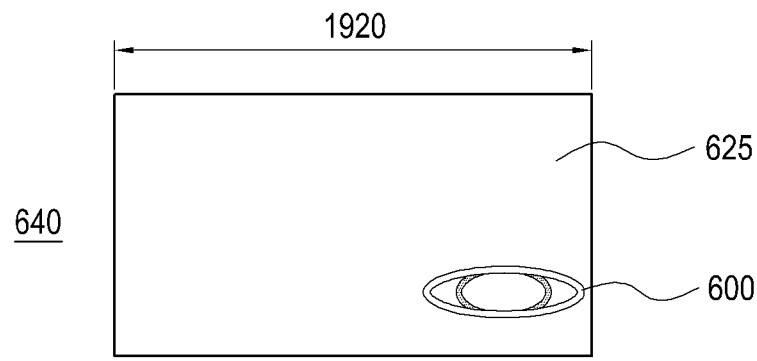

In a period T4, a 3D image is generated in each 3D shift image area based on the input depth data corresponding to a partial 3D image area for each view point, and pixels in the remaining 2D image area outside of each 3D shift image area are allocated a gray value. The allocated gray value may be a black gray value, a white gray value, or some other arbitrarily chosen gray value. Each 3D sum image is generated, which has each 3D shift image area having a 3D image for each view point and the remaining 2D image area having an allocated gray value. A synthesized 3D image signal obtained by interweaving and scaling each 3D sum image so that a resolution of each of nine 3D sum images corresponding to nine view points may be identical to a resolution of the LCD panel 120, is provided to the LCD panel 120. In this period, the lenticular device 130 and the backlight source 110 are both on, and a higher voltage is applied the backlight source 110 so as to radiate irradiation light being brighter than that in the period T2. FIG. 6C shows an example of an output image provided to a display panel according to an embodiment of the present invention. In the example shown in FIG. 6C, an output image 640 includes 3D sum area 600, where the 3D image is displayed, and the remaining 2D image area 625, where the 2D image having an allocated gray value is displayed, when displaying a 3D image in period T4 using the input image data of FIG. 2.

Assuming that each of the periods T1, T2, T3, and T4 is a quarter of the 1-frame period, liquid crystals used in the LCD panel 120 and the lenticular device 130 are not required to be liquid crystal capable of responding fast. For example, Merck's nematic liquid crystal with a product code-named MAT-10-238 may be used as these liquid crystals. Although the periods T1, T2, T3, and T4 are each shown as a quarter of the 1-frame period, an ordinarily skilled artisan will understand that when displaying black images in periods T1 and T4, the black images may actually be displayed for a shorter period of time than the images displayed in periods T2 and T4 due to the operational characteristics of an LCD panel. Consequently, FIG. 3 does not mandate that each image displayed in each period T1, T2, T3, and T4 is displayed for the same amount of time.

As described above, a black image may be generated in periods T1 and T3 by turning off the backlight source 110. As an ordinarily skilled artisan understands, other options are possible in these periods. For example, the backlight source 110 may be on, and black gray values may be provided to all pixels. Alternatively, a gray value besides a black value may be provided to all pixels while the backlight source 110 is on.

FIG. 4A, FIG. 4B, FIG. 4C, and FIG. 4D illustrate schematic flowcharts according to exemplary embodiments of the present invention.

Figure 4A:
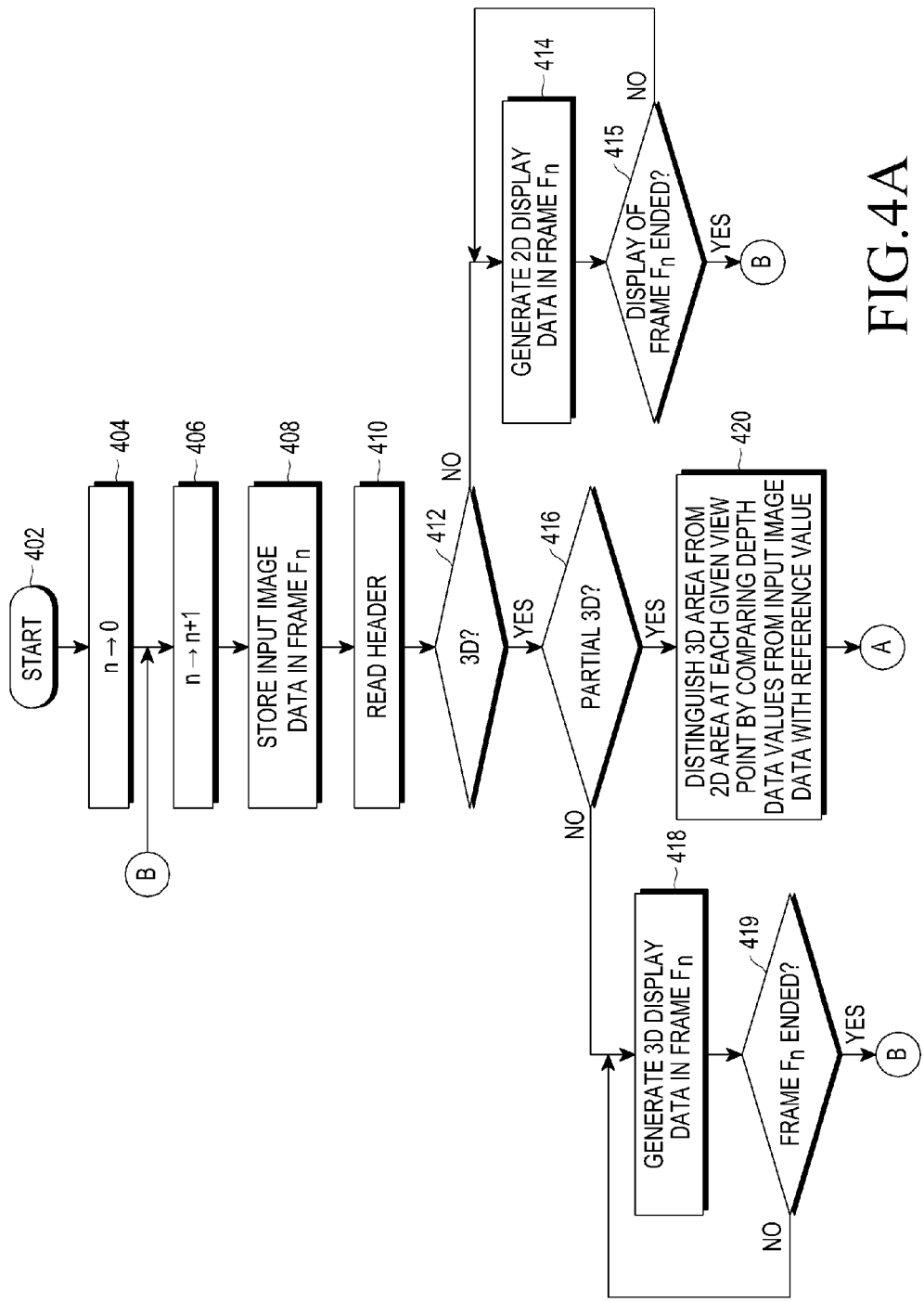
FIG. 4A, FIG. 4B, FIG. 4C, and FIG. 4D are schematic flowcharts illustrating a driving method according to an exemplary embodiment of the present invention.
Figure 4B:
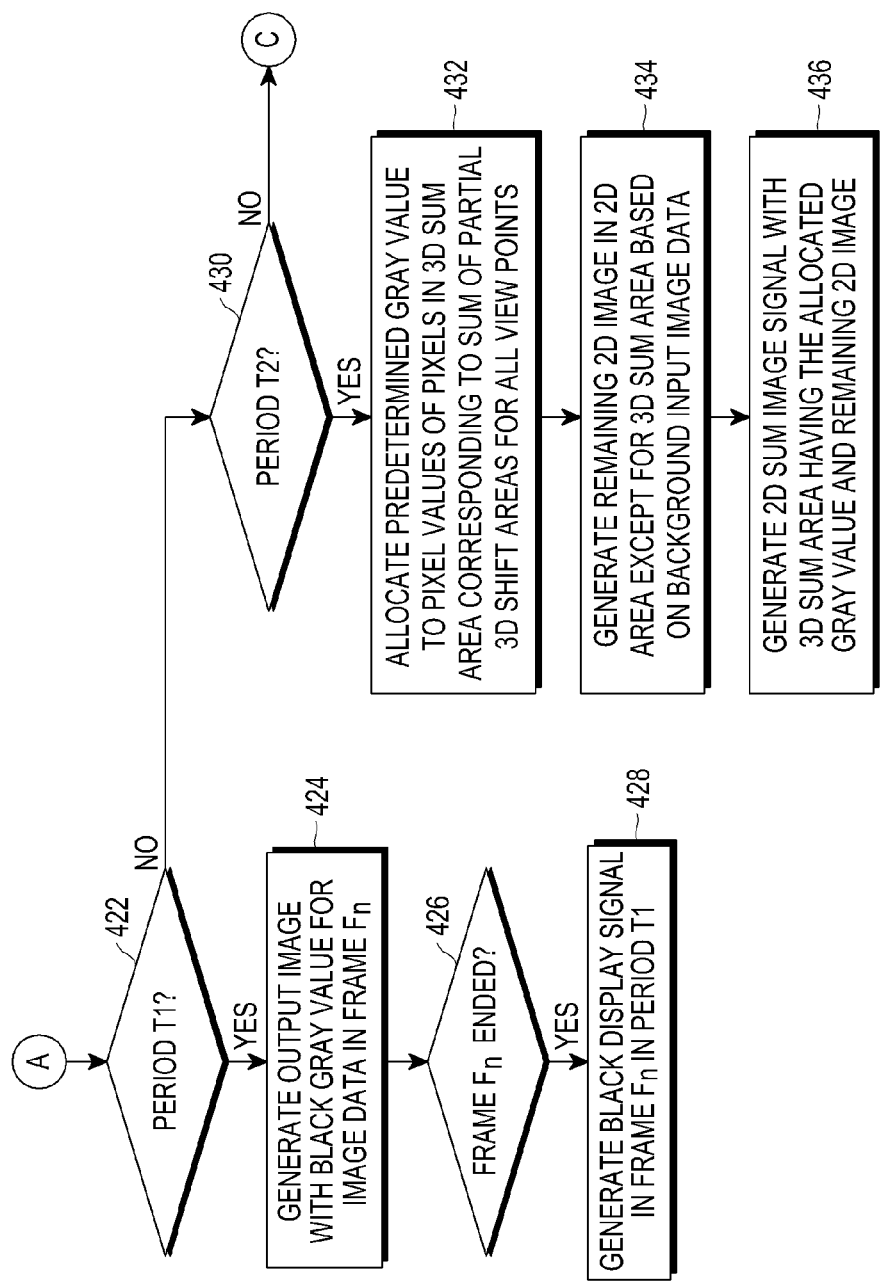
Figure 4C:
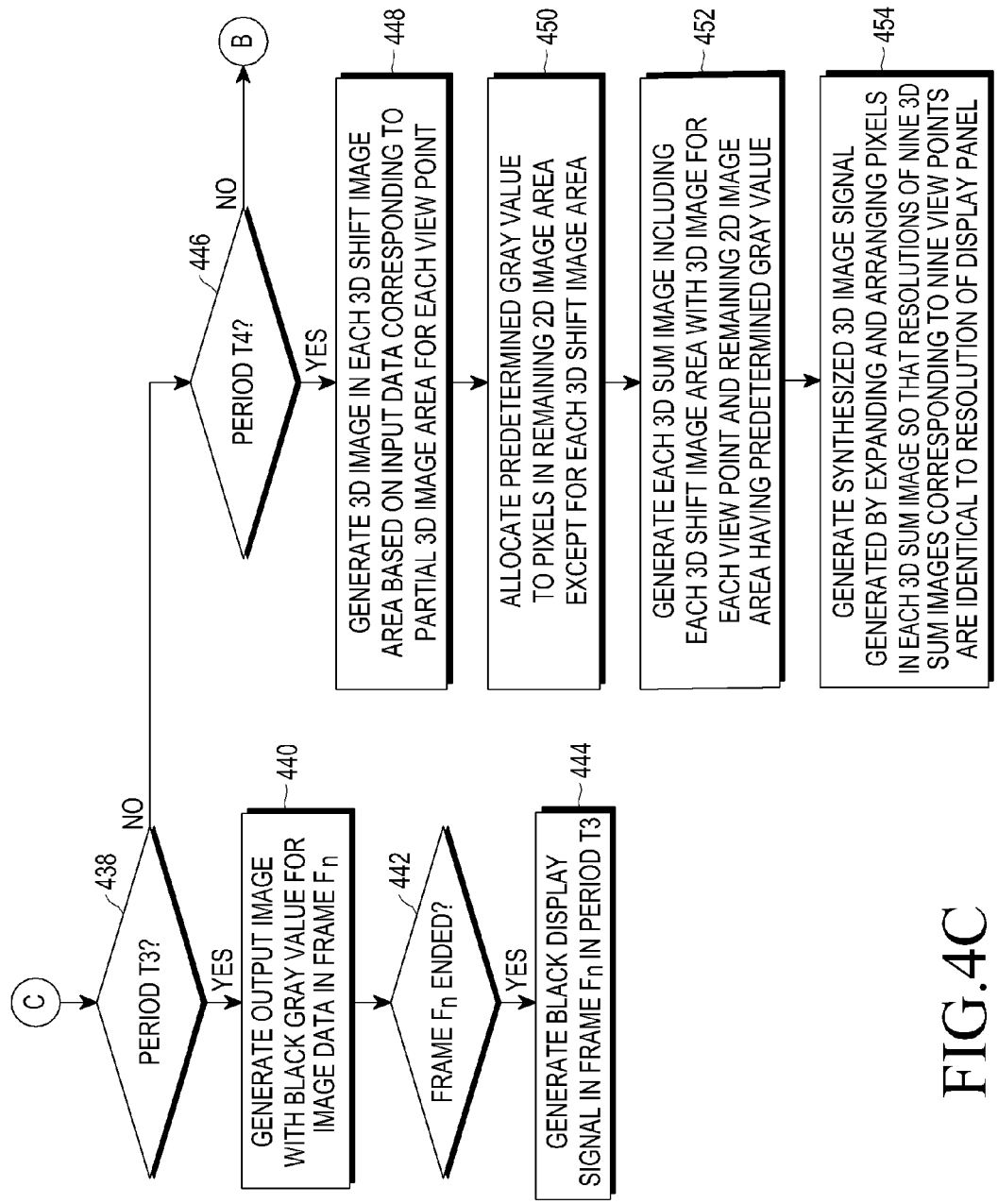

Referring to FIG. 4A, step 402 is an initiation process. In step 404, initialization is performed to set n to '0'. In step 406, n is set to '1'. In step 408, input image data in a frame $F_1$ or the first frame is stored in the memory 203. In other words, in the memory 203 are stored 2D input image (or pixel) data existing in the area LU existing in the first frame and having a resolution of 960×540 as illustrated in FIG. 2, and input depth data existing in the area RU having the same resolution and corresponding to the 2D input image (or pixel) data; and input background data existing in the area LL having the same resolution and corresponding to the 2D input image (or pixel) data, and input background depth data existing in the area RL having the same resolution and corresponding to the input background data.

In step 410, a header is read from the input image data stored in the memory 230. The header provides information, based on which it is possible to determine whether the input image data is data representing a 3D image, a 2D image, or a partial 3D image. The header may be read from data of pixels arranged in a first row of the resolution of 960×540. Pixels arranged in each row include R, G and B sub-pixels, as described above, and because each pixel has 8-bit data, the header may be defined by values of Most Significant Bit (MSB) bits of an appropriate pixel or pixels.

In step 412, it is determined whether the read header represents a 3D image. If it is not a 3D image, because the input image data in the frame $F_1$ represents a 2D image, a 2D output image may be generated from 2D input image data in the area LU according to any suitable method used to generate a 2D image, as indicated in steps 414 and 415. In succeeding frames, 2D output images may be generated by repeating steps 406 to 415. If the read header represents a 3D image but not a partial 3D image, a 3D output image may be generated with 2D input image data and its associated depth data by any suitable method, such as that disclosed, for example, in United States Patent Publication No. 2009/0115780 stated above, in steps 418 and 419. Thereafter, in succeeding frames, 3D output images may be generated by repeating steps 406 to 412 and steps 416 to 419. If the read header represents a partial 3D image in step 416, step 420 is performed.

Step 420 and its succeeding steps are performed when a 3D image area is present in a 2D image area according to exemplary embodiments of the present invention. Step 420 is to distinguish between a partial 3D shift image area and the remaining 2D image area outside of the partial 3D shift image area according to exemplary embodiments of the present invention. Assume that nine view points are present, and as to the input image data, 2D input image (or pixel) data has the partial 3D input area 202 in the 2D input image area 204 as illustrated in FIG. 2. In this case, input depth data in a first area 206, which corresponds to pixel data in the remaining area outside of the partial 3D input area 202 in the 2D input image area 204, has a reference value of 128 as described above, because this remaining area has a 2D image. However, because the partial 3D input image in the partial 3D input area 202 has a 3D image, input depth data in a second area 208 corresponding to the partial 3D input area 202 has values other than the reference value. Therefore, in the case where depth values of pixels existing in the vicinity of the boundary of the second area 208, which corresponds to the boundary of the partial 3D input area 202, are compared with the reference value of 128, and have other non-128 depth values representing a 3D image, a shift of the partial 3D input area 202 for each of the nine view points is determined by the other depth values referring to the look-up table stored in the memory 230, and the partial 3D input area 202 may be distinguished from the 2D area by the shifted partial 3D input area, for each view point. In other words, the boundary of the partial 3D input area 202 may be determined by detecting start points and end points of depth data values other than the reference value while sequentially scanning the lines in the area RU. Each partial 3D shift area for each view point is distinguished from the 2D area by calculating depth data values of the start points and the end points representing the boundary in accordance with Equation (1), or by referring to the look-up table stored in the memory 230. In other words, at the edge of the partial 3D input area 202, depth data of pixels is compared with the reference value, and at the edge, a partial 3D shift area for each view point may be distinguished from the 2D area based on depth data values other than the reference value. FIG. 2 shows a single partial 3D input area 202 in area LU only for ease of description. It is apparent that multiple partial 3D input areas may exist in area LU.

Figure 4D:
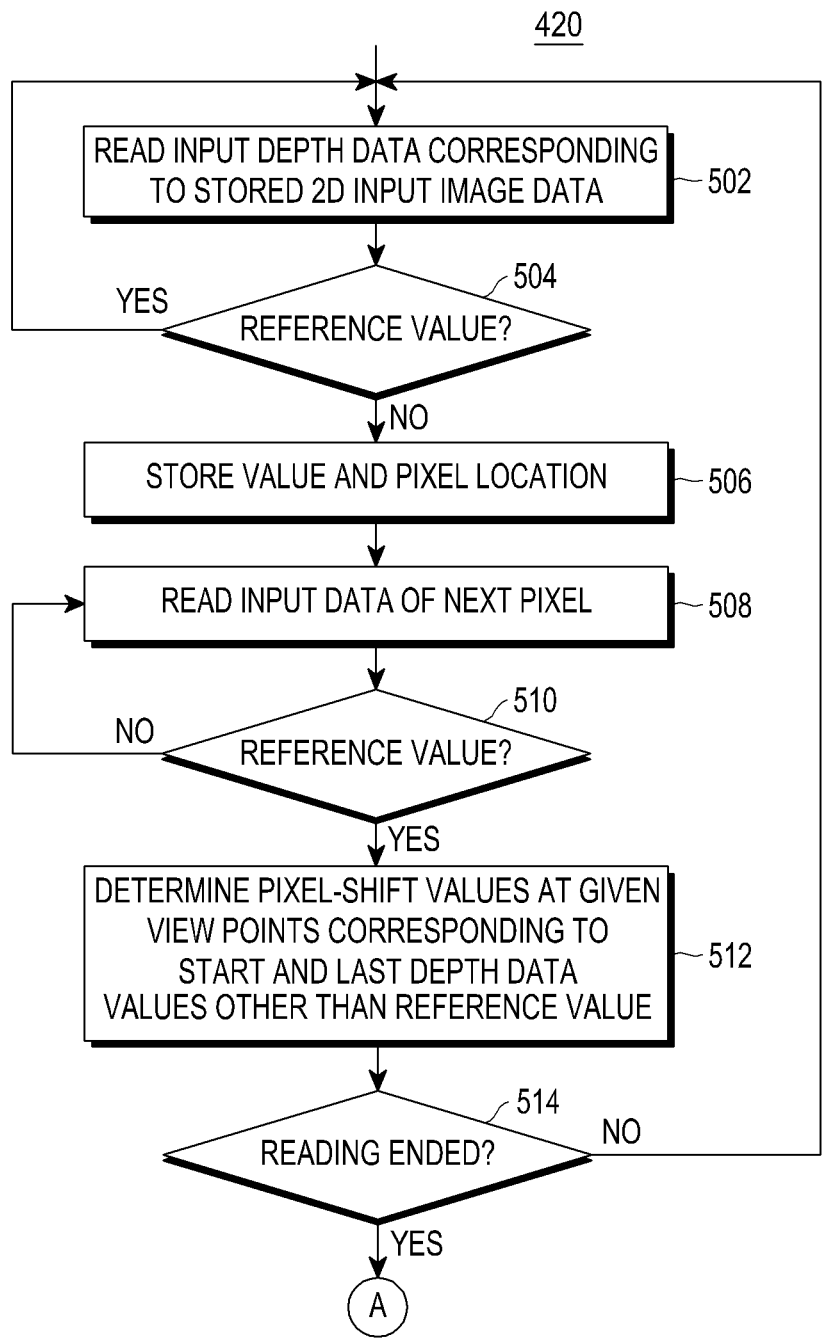

FIG. 4D illustrates a schematic subroutine of step 420. In step 502, input depth data corresponding to 2D input image data is read by sequentially scanning row lines in the area RU of FIG. 2. In step 504, it is determined whether a value of the read depth data is a reference value. If the read depth data value is the reference value, the next input depth data is read and compared with the reference value. This continues until the input depth data value is not the reference value. If the read depth data value is not the reference value, then the value and pixel location are stored in step 506. Next, in step 508, the next input depth data is read, and in step 510, the read depth data is compared with the reference value. If the read depth data value is not the reference value, the next input depth data is read and compared with the reference value. A set of start and end depth data values, which are detected by scanning row lines and are not the reference value as a result of steps 504 to 510, become the boundary or edge of a partial 3D input area. Information about the area having depth data values and their locations at the boundary or edge, or having depth data values other than the reference value, may be stored in the memory 230. In step 512, at the boundary or edge, pixel-shift values at each view point may be determined by calculating them using the depth data values and Equation (1), or by referring to the look-up table stored in the memory 230. Steps 502 to 512 are repeated until the last pixel in each row is read and until the last row of the area RU is scanned. When it is determined that the last row has been scanned (step 514), the process of distinguishing at least one 3D image display area in a 2D image display area is complete. As described above, pixel-shift values at each view point are determined at step 512 after scanning each row of the area RU. Alternatively, all rows of the area RU may be scanned before determining pixel-shift values.

Turning back to FIG. 4B, the timings illustrated in FIG. 3 run. In step 422, if the current period is a period T1, an output image is generated in step 424 so that image data in a previous frame $F_1$ may have a black gray value. In step 426, it is determined if the generation of an output image with a black gray value has been performed for all image data in the previous frame $F_1$. If so, a black display signal for all image data in the frame $F_1$ is provided to the LCD panel 120 within the period T1 in step 428.

In step 430, in a period T2, which starts after a lapse of the period T1, pixel values of pixels in a 3D sum area corresponding to a sum of distinguished partial 3D shift areas for all view points are allocated an arbitrary gray value, such as the white or black gray value, in step 432. In step 434, the remaining 2D image is generated in the 2D area outside of the 3D sum area based on background 2D input image data in the area LL and/or 2D input image data in the area LU. In step 436, a 2D sum image signal with the 3D sum area having the allocated gray value and the remaining 2D image is generated and provided to the LCD panel 120. In the period T2, the backlight source 110 is on and the lenticular device 130 is off, because only 2D images are displayed.

In a period T3 after a lapse of the period T2, steps 440 to 444 are performed. Steps 440 to 444 are similar in operation to steps 424 to 428 performed in the period T1. Therefore, in the period T3, a display signal is generated so that all pixels may have a black gray value in the frame $F_1$, and in the periods T3 and T1, the LCD panel 120 displays a black image.

In a period T4 after a lapse of the period T3 in step 446, steps 448 to 454 are performed. In step 448, a 3D image is generated in each 3D shift image area based on input depth data corresponding to a partial 3D image area for each view point. In step 450, a gray value is allocated to pixels in the remaining 2D image area outside of each 3D shift image area for each view point. In step 452, each 3D sum image is generated, which has each 3D shift image area having a 3D image for each view point and the remaining 2D image area having the allocated gray value. Therefore, each of nine 3D sum images for nine view points has a resolution of 960×540, as described above. Each of the 3D sum images is standardized to have a resolution of 1920×1080, and a synthesized 3D image, which is created by arrangement of pixels generated by mapping nine standardized 3D sum images to become an autostereoscopic image, is provided to the LCD panel 120 in step 454. After the data processing for the frame $F_1$ is completed, the same data processing is performed on the next frame $F_2$ in step 406 and its succeeding steps.

The above-described method of autostereoscopically displaying partial 3D images may be carried out by a program in a processor.

As is apparent from the foregoing description, when an input image like that shown in FIG. 2 is autostereoscopically displayed, a 2D area and a 3D area are distinguished from each other, and a resolution of the 2D area is ¼ the normal resolution because the area LU in FIG. 2 is enlarged four times. However, in the case where a 2D area and a 3D area are processed together for 3D image display according to the prior art, because the resolution is inversely proportional to the number of view points during the full-screen display, if the number of view points increases, the conventional resolution is reduced, compared with when a 2D area is separated to generate a 2D image.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for autostereoscopically displaying a three-dimensional (3D) image existing in a partial 3D image area located in a two-dimensional (2D) image display area, on a display panel at a first view point based on input data comprising 2D input image data and its associated input depth data, the method comprising:
   generating output distinguishing each 3D shift image area of the partial 3D image area from the 2D image display area in a boundary of the partial 3D image area at each given view point among a plurality of given view points being different from the first view point, based on data values of the input depth data, each of the given view points being associated with different pixel shift data; and
   displaying, via the display panel, the 3D image in the partial 3D image area based on the output.

2. The method of claim 1, wherein each 3D shift image area is represented by depth data values that are different from a reference value, and the reference value is a depth data value representing the 2D input image.

3. The method of claim 2, wherein the input data further comprises background input data corresponding to the 2D input image data;
   wherein the method further comprises generating a remaining 2D image in a 2D area outside of a 3D sum area corresponding to a sum of the 3D shift image areas for the given view points, based on background input image data.

4. The method of claim 3, further comprising allocating a gray value to pixels in the 3D sum area.

5. The method of claim 4, further comprising generating a 3D image in each of the 3D shift image areas based on the input depth data corresponding to the partial 3D image area.

6. The method of claim 5, further comprising allocating a gray value to pixels in the 2D image display area outside of the 3D shift image areas.

7. An apparatus for autostereoscopically displaying a three-dimensional (3D) image existing in a partial 3D image area located in a two-dimensional (2D) image display area, on a display panel at a first view point based on input data comprising 2D input image data and its associated input depth data, the apparatus comprising:
   a 3D area distinguishing circuit configured to generate output to distinguish each 3D shift image area of the partial 3D image area from the 2D image display area in a boundary of the partial 3D image area at each given view point among a plurality of given view points being different from the first view point, based on data values of the input depth data being different from a reference value, each of the given view points being associated with different pixel shift data; and
   the display panel configured to display the 3D image in the partial 3D image area based on the output.

8. A method for distinguishing a three-dimensional (3D) image in at least one partial 3D image area located in a two-dimensional (2D) image display area at a first view point, based on input data comprising 2D input image data and its associated input depth data, the method comprising:
- distinguishing presentation of a 3D shift image area on a display panel from the 2D image display area by comparing the input depth data associated with the 2D input image data with reference data in a boundary of the at least one partial 3D image area at a given view point being different from the first view point, the first view point being associated with a different 3D image than the given view point; and
- distinguishing the at least one partial 3D image area at the first view point based on the comparison.

9. The method of claim 8, wherein the reference data is depth data that represents 2D images in the 2D image display area.

10. An apparatus for distinguishing a three-dimensional (3D) image in at least one partial 3D image area located in a two-dimensional (2D) image display area at a first view point, based on input data comprising 2D input image data and its associated input depth data, the apparatus comprising:
- a processor; and
- a memory comprising computer code, the memory and the computer code configured to, with the processor, cause the apparatus at least to:
  - receive the input data;
  - distinguish a 3D shift image area from the 2D image display area via comparison of the input depth data associated with the 2D input image data with reference data in a boundary of the at least one partial 3D image area at a given view point being different from the first view point, the first view point being associated with a different 3D image than the given view point; and
  - distinguish the at least one partial 3D image area at the first view point based on the comparison.

11. The apparatus of claim 10, wherein the reference data is depth data that represents 2D images in the 2D image display area.

12. A method of displaying a three-dimensional (3D) image on a display panel comprising first pixels and second pixels, the method comprising:
- displaying, via the display panel, a two-dimensional (2D) image during a first period of an image frame by using the first pixels to display the 2D image according to 2D image input data and by setting the second pixels at the same gray value; and
- displaying, via the display panel, a 3D image during a second period of the image frame by using the second pixels to display the 3D image according to 3D image input data and by setting the first pixels at the same gray value.

13. The method of claim 12, wherein in the first period of the image frame, the second pixels are set to display a first black image, and in the second period of the image frame, the first pixels are set to display a second black image.

14. The method of claim 12, further comprising displaying a first black image during a third period of the image frame by using the first pixels and the second pixels.

15. The method of claim 14, further comprising displaying a second black image during a fourth period of the image frame by using the first pixels and the second pixels.

16. The method of claim 15, wherein the image frame sequentially comprises the third period, the first period, the fourth period, and the second period.

* * * * *